March 23, 1937.  T. Y. OLSEN  2,074,417
VIBROMETER
Filed Aug. 1, 1933
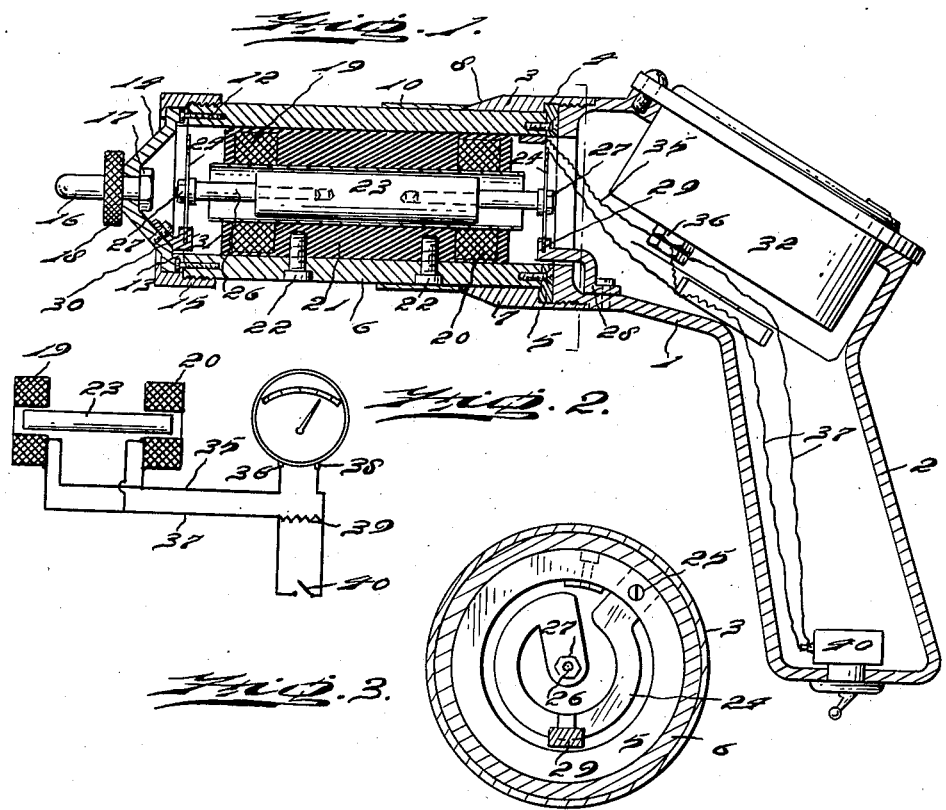
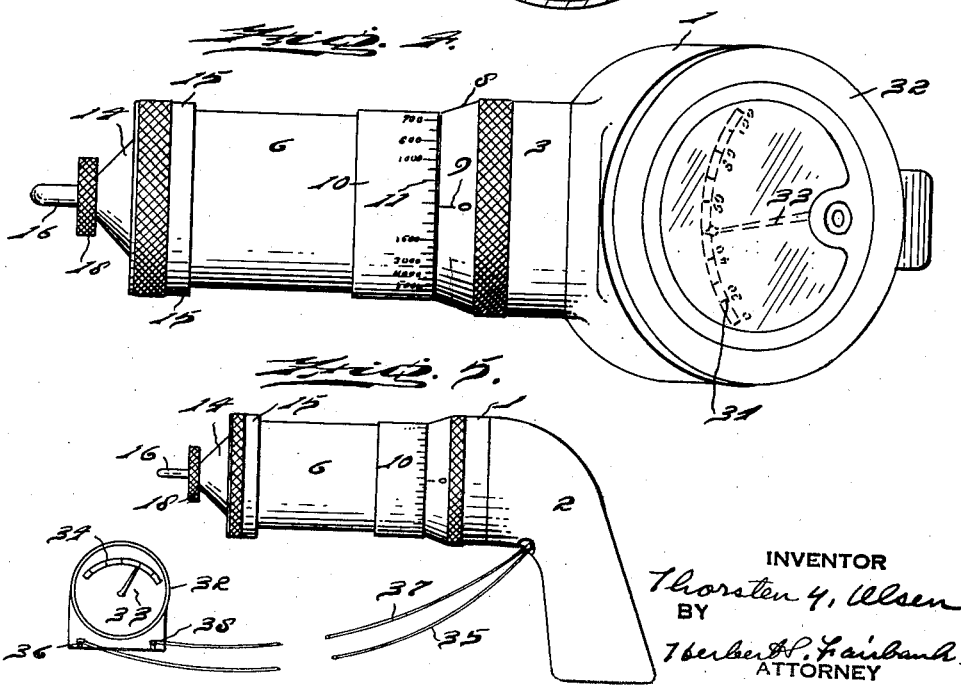
INVENTOR
Thorsten Y. Olsen
BY
Herbert P. Fairbank
ATTORNEY Patented Mar. 23, 1937

2,074,417

UNITED STATES PATENT OFFICE 2,074,417

VIBROMETER

Thorsten Y. Olsen, Philadelphia, Pa.

Application August 1, 1933, Serial No. 683,107

2 Claims. (Cl. 177—351)

The object of my invention is to devise a novel vibrometer which, when influenced by vibrations of a body being tested, will generate an electric current, which is conducted to a meter, so that the amount of vibratory movement of the body being tested can be measured and visibly indicated.

A further object of this invention is to devise a novel vibrometer having coils and an armature in the form of a magnet which is resiliently mounted on springs, and provision is made for varying the effective lengths of the springs so that a very wide range of readings is obtainable.

A further object of the invention is to devise a novel portable vibrometer which can be readily held in the hand of the operator, and which, when brought into contact with a vibrating member, will generate an alternating electric current indicative of the vibrations of such vibratory member.

With the above and other objects in view as will hereinafter clearly appear, my invention comprehends a novel vibrometer.

It further comprehends a novel vibrometer having an armature in the form of a magnet which is resiliently mounted within the windings of the coils, so that, when the vibrometer is brought into contact with a vibrating object, an alternating electric current will be generated indicative of the vibratory movement of the object. This current is conducted to an A. C. meter.

It further comprehends novel means for varying the effective lengths of the springs which support the armature in a floating position with respect to the coils.

It further comprehends a novel construction and arrangement of a casing having a grasping handle, coils and their armature, a resilient mounting for the armature, and an electric circuit for a meter, such circuit having a controllable resistance which may be employed, if desired, to vary the range of readings of the meter.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a sectional elevation of a vibrometer embodying my invention.

Figure 2 is a wiring diagram.

Figure 3 is a section on an enlarged scale on line 3—3 of Figure 1.

Figure 4 is a top plan view of the vibrometer.

Figure 5 is a side elevation of another embodiment of my invention, wherein the meter is not carried by the frame of the vibrometer.

Similar numerals indicate corresponding parts.

Referring to the drawing:

I designates the frame of a vibrometer embodying my invention.

The frame is preferably chambered and has a pistol grip type of grasping handle 2. The frame I is threaded at its forward end to adapt it to receive a threaded coupling collar 3 which is recessed as at 4 to receive a ring 5 secured to the casing 6 by fastening devices 7. The coupling collar is bevelled at its forward end as at 8 and provided with a graduation 9 which cooperates with the graduations II on a collar I0, secured to the casing 6 in any desired or conventional manner.

The casing 6 has secured to it at its forward end by fastening devices 12 a ring 13 against which the inner portion of a disc 14 bears. The disc 14 is secured to the casing 6 by a flanged coupling collar 15 in threaded engagement with the casing 6. The disc 14 is dished or bulged outwardly at its central portion and has a rod 16 passing through it and fixed to it by a nut 17. The rod 16 has a knurled shoulder 18 which facilitates the turning of the disc, as will be hereinafter explained.

The windings of the coils 19 and 20 mounted in insulating material 21 are fixed within the casing 6 by fastening devices 22.

The coils 19 and 20 cooperate with an armature 23 which is preferably a permanent magnet and forms the armature of the coils. This armature is resiliently mounted in a novel manner, being supported by helical flat springs 24 which are secured at their outer ends to the rings 5 and 13 respectively by fastening devices 25. Each of the springs at their inner ends terminates in an inwardly deflected apertured portion which is secured to a rod 26, connected with the armature, by a fastening device 27.

Novel means are provided for varying the effective lengths of the springs and thereby their resiliency.

The frame I has fixed to it an arm 28 having a slotted end 29 adapted to receive the flat spring 24 nearest the frame so that when the casing 6 is rotated on the frame the effective length of the spring 24 nearest the frame is varied.

The disc 14 which is rotatably adjustable on the casing 6 has fixed to it an arm 30 having a slotted end 31 to receive the flat spring 24 at the forward end of the casing 6.

The frame 1 may be apertured to receive an A. C. meter 32 having a dial hand 33 and graduations 34 or this meter may be placed at any desired location as will be understood from Figure 5.

Referring now to the wiring diagram seen in Figure 2, a conductor 35 leads from the coils to a binding post 36 of the meter. A conductor 37 leads from the coils to a binding post 38. The line formed by the conductor 37 may have in it a resistance 39 of any desired character such as a rheostat, carbon or other resistance controlled by a switch 40.

If the resistance 39 is used the range of the reading on the meter is increased.

In the use of the vibrometer it may be placed on the object to be tested or it may be grasped in the hand and the rod 16 held against the object. The graduations 11 are indicative of the revolutions per minute of the object if the object is rotating. If the object is vibrating relative movement will be effected between the coils and armature to generate an alternating electric current which is measured and visibly indicated on the meter.

By rotating the casing 6 the effective length of the spring 24 at the rear end of the casing may be varied and by rotating the disc 14 the effective length of the spring 24 at the forward end of the casing may be varied.

In this manner the value of the greatest amplitude of vibrations of the object being tested can be determined, and the reading referred to a chart.

Having thus described my invention what I claim as new and desire to secure by Letters Patent is:

1. In a vibrometer, a frame, a casing rotatably carried by the frame, coils within the casing, an armature within the coils, a helical spring having one end fixed to the casing and its other end to the armature, means carried by the frame to vary the effective length of the spring on the rotation of the casing, a second helical spring having one end fixed to the casing and the other end secured to said armature, and a member rotatable on the casing and cooperating with said second spring to vary its effective length on relative rotation of the member and casing.

2. In a vibrometer, a frame having a grasping handle and having an indicator marking, a casing rotatable on the frame, a graduated collar on the casing to cooperate with said marking, coils within the casing, an armature within the coils, helical springs secured at their outer ends to the casing and at their inner ends to the armature to float the latter, a disc rotatably mounted on the casing, a rod extending from said disc, means actuated by relative rotation of the casing and frame to vary the effective length of one spring, and means actuated by relative rotation of said disc and casing to vary the effective length of the other spring.

THORSTEN Y. OLSEN.